(12) United States Patent
Ullein et al.

(10) Patent No.: US 7,461,624 B2
(45) Date of Patent: Dec. 9, 2008

(54) COMPENSATING SHAFT DRIVE

(75) Inventors: Thomas Ullein, Frensdorf (DE);
Reinhard Koch, Wachenroth (DE)

(73) Assignee: Schaeffler KG, Herzogenaurach (DE)

( * ) Notice: Subject to any disclaimer, the term of this patent is extended or adjusted under 35 U.S.C. 154(b) by 8 days.

(21) Appl. No.: 11/572,031

(22) PCT Filed: Jun. 25, 2005

(86) PCT No.: PCT/EP2005/006878

§ 371 (c)(1),
(2), (4) Date: Jan. 12, 2007

(87) PCT Pub. No.: WO2006/005430

PCT Pub. Date: Jan. 19, 2006

(65) Prior Publication Data

US 2008/0041330 A1  Feb. 21, 2008

(30) Foreign Application Priority Data

Jul. 14, 2004  (DE)  .................  10 2004 033 927

(51) Int. Cl.
*F02B 75/06* (2006.01)
(52) U.S. Cl. .................. 123/192.2; 74/603; 474/148
(58) Field of Classification Search .............. 123/192.2, 123/192.1, 90.31; 74/603, 604, 434, 437; 474/148, 141, 152
See application file for complete search history.

(56) References Cited

U.S. PATENT DOCUMENTS

| 4,865,577 | A | * | 9/1989 | Freudenstein | ............... | 474/141 |
| 5,882,025 | A | * | 3/1999 | Runnels | ..................... | 280/259 |
| 7,044,875 | B2 | * | 5/2006 | Gajewski | .................... | 474/148 |

FOREIGN PATENT DOCUMENTS

| BE | 864208 X | 6/1978 |
| DE | 19520508 X | 12/1996 |
| DE | 20220367 X | 7/2003 |
| JP | 58225242 X | 12/1983 |
| JP | 60104829 X | 6/1985 |
| JP | 63088368 X | 4/1988 |

* cited by examiner

*Primary Examiner*—Stephen K Cronin
*Assistant Examiner*—Hyder Ali
(74) *Attorney, Agent, or Firm*—Lucas & Mercanti, LLP

(57) ABSTRACT

A compensating drive for driving a compensating shaft of an internal combustion engine, comprising a toothed belt or a chain, which connects a crankshaft driven wheel of the internal combustion engine to a drive wheel on the compensating shaft or shafts, in which case the crankshaft driven wheel (2, 2') and/or the drive wheel or wheels (5) of the compensating shafts (4) are shaped to be non-circular in such a way that they transmit to the drive a variability, which at least partially compensates the vibrations produced during the rotation of the crankshaft (1).

3 Claims, 2 Drawing Sheets a > b

COMPENSATING SHAFT DRIVE

FIELD OF THE INVENTION

The invention pertains to compensating drives for driving one or more compensating shafts of an internal combustion engine, comprising a toothed belt or a chain, which connects a crankshaft driven wheel of the internal combustion engine to one or more drive wheels on the compensating shafts.

BACKGROUND OF THE INVENTION

The compensating drives start, in principle, at the crankshaft of the internal combustion engine and drive massloaded shafts (compensating shafts), which give rise to a piston mass balance, for example. Generally, such drives are distinguished in that the strain on the traction means is very high. First and foremost, this is caused in that, due to their high inertia, the compensation shafts tend to rotate with uniform rotary motion. Due to the variability during the rotation of the crankshaft, this variability is transferred to the compensation shaft via the traction means, i.e. via the toothed belt or the chain, which leads to extreme strains on the traction means. The situation is yet aggravated in that the compensation shafts often rotate at twice the engine speed, which causes an additional strain (centrifugal force+abrasion-induced strain) on the traction means. This is why these drives are often not fatigue endurable and in many cases need to be repaired.

SUMMARY OF THE INVENTION

The invention is thus based on the object of embodying a compensating drive of the above-mentioned type in such a way that a reduction in the strain on the traction means and thus an extension of the service life of such drive is achieved.

To solve this object, provision is made according to the invention that the crankshaft driven wheel and/or the drive wheel or wheels of the compensating shafts are shaped to be non-circular in such a way that they transmit to the drive a variability, which at least partially compensates the vibrations produced during the rotation of the crankshaft.

The invention thus also makes use of drive damping by means of the non-circular shape of a toothed drive wheel, which is already in use and has already proven itself for operational controls, for the case of a compensating shaft drive, where, until now, such drive damping was not provided.

In one embodiment of the invention, provision can be made for the drive wheel and/or the driven wheel to be embodied so as to be oval or polygonal, the shape being essentially only a function of the number of the cylinders of the internal combustion engine, because the shape first and foremost causes the variability produced during the crankshaft rotation and thus also predefines the frequency at which the specific introduction of a counter-variability must occur. For four-cylinder engines, it is recommended to embody the driven wheel or the drive wheel so as to be oval.

The non-circular shape according to the invention achieves the situation where, in phases of accelerated motion, that is to say when the ignition stroke occurs in the piston of the internal combustion engine, the traction means is at a smaller diameter, so as to reduce the acceleration in the traction means and thus to reduce the strain.

BRIEF DESCRIPTION OF THE DRAWINGS

Further advantages, features and details of the invention can be gathered from the following description of an exemplary embodiment. In the drawings.

DETAILED DESCRIPTION OF THE DRAWINGS

Figure 1:
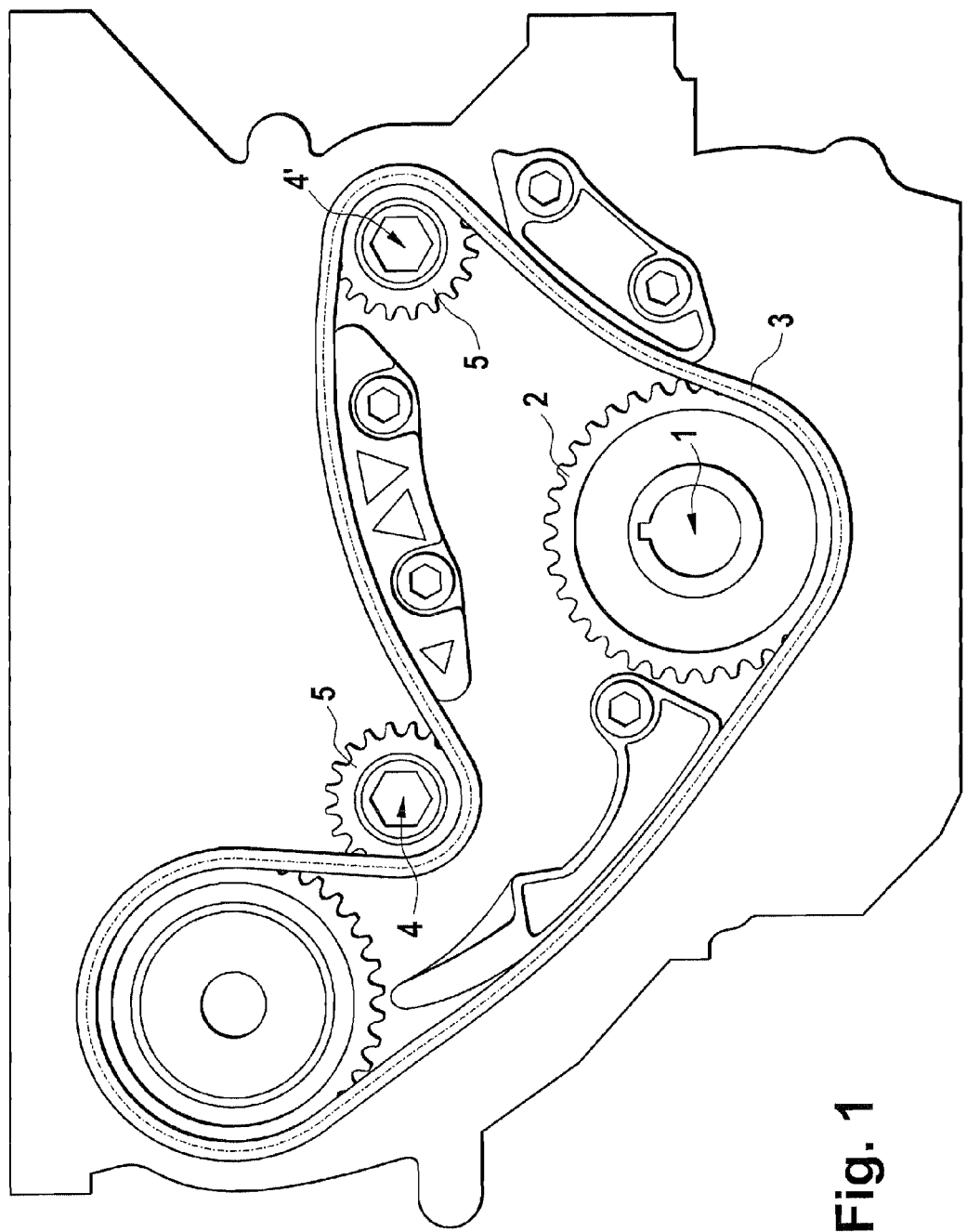
FIG. 1 shows a partial view of an engine compartment with the crankshaft and two compensating shafts with a chain drive.
Figure 2:
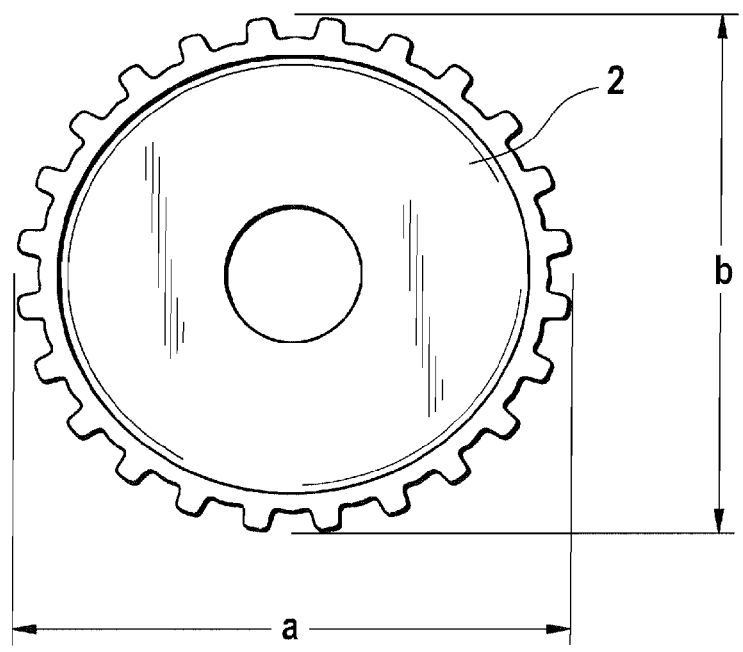
FIG. 2 shows a view of a toothed wheel which can be used as a driven wheel or as a drive wheel for a compensating drive according to the invention and is intended for a belt drive.
Figure 3:
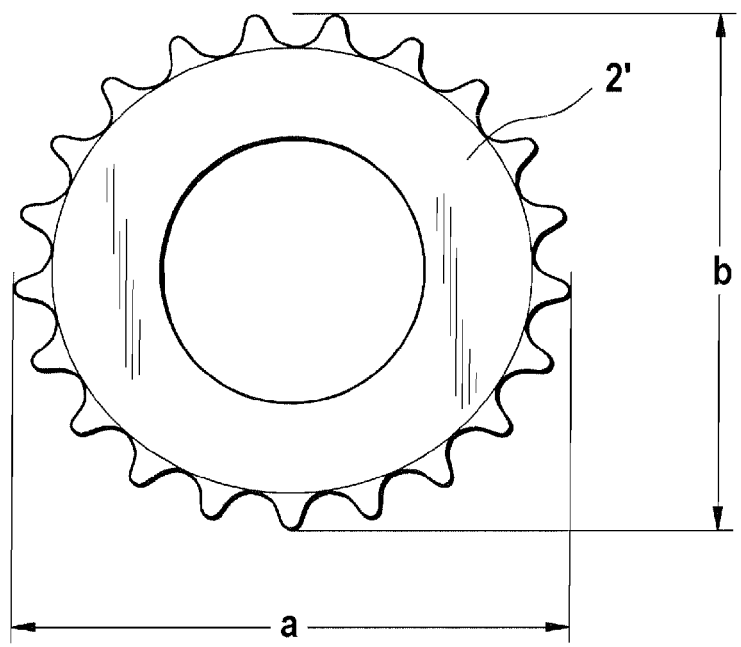
FIG. 3 shows a view of a toothed wheel which can be used as a driven wheel or as a drive wheel for a compensating drive according to the invention and is intended for a chain drive.

In the engine section according to FIG. 1, reference numeral 1 refers to the crankshaft, on which, according to the invention, in addition to the other common toothed driven wheels, a toothed driven wheel 2 from FIG. 2 embodied according to the invention is fitted in a rotationally fixed manner so as to drive the compensating shafts 4 and 4' via a chain or toothed belt 3. A toothed drive wheel 5 is located on both, and this toothed drive wheel 5 can be embodied as a compensating toothed wheel with oval or polygonal shape either instead of the toothed driven wheel 2 or in addition thereto. If the toothed driven wheel 2 and/or the toothed drive wheels 5 according to FIG. 2 are embodied so as to be oval, the result is optimal compensation for a four-cylinder engine. The same also holds true for the toothed wheel 2 in FIG. 2, which is suitable for use as a toothed driven wheel or as a toothed drive wheel and is shaped specifically as a belt wheel for a belt drive.

REFERENCE NUMERALS

1 crankshaft
2, 2' toothed driven wheel
3 toothed belt/chain
4, 4' compensating shafts
5 toothed drive wheel

The invention claimed is:

1. A compensating drive for driving a compensating shaft of an internal combustion engine, comprising a toothed belt or a chain, which connects a crankshaft driven wheel of the internal combustion engine to one or more drive wheels on the compensating shafts, wherein the crankshaft driven wheel and the drive wheel or wheels of the compensating shafts are shaped to be non-circular in such a way that they transmit to the drive a variability, which at least partially compensates the vibrations produced during the rotation of the crankshaft.

2. The compensating drive as claimed in claim 1, wherein the driven wheel and the drive wheel or wheels are embodied so as to be oval.

3. The compensating drive as claimed in claim 1, wherein the driven wheel and the drive wheel or wheels are embodied so as to be polygonal.

* * * * *